ELECTROMAGNETIC DELAY DEVICE

Filed June 2, 1965

INVENTORS
CLAUDE MONIN
PIERRE MOCH
BY Paul M. Craig, Jr.
ATTORNEY

United States Patent Office 3,413,415
Patented Nov. 26, 1968

3,413,415
ELECTROMAGNETIC DELAY DEVICE

Claude Monin, Villennes-sur-Seine, and Pierre Moch, Sucy-en-Brie, France, assignors to C.I.T. Compagnie Industrielle des Telecommunications, Paris, France
Filed June 2, 1965, Ser. No. 460,663
Claims priority, application France, June 3, 1964, 976,970
18 Claims. (Cl. 178—70)

The present invention relates to arrangements for detecting the state of an electric current satisfying certain requirements and for controlling the corresponding operations while bringing in no element likely to disturb appreciably the normal operation of the circuit.

By way of example, such a device in accordance with the instant invention will be described in the particular case when it is used as a telegraph monitoring relay; it is, however, to be understood that the invention is not limited to such an application and that the arrangement according to the invention is capable of adaptation to numerous automation problems effecting industries of very different types.

As is known, the telegraph monitoring or supervisory relay in telegraphy systems is often located in the connecting circuit of an automatic selector, series-mounted on the line wire. The connecting circuit is the unit controlled by the recorder, which establishes the conducting link between the caller and the addressee. Thus, when after checking the selection of the addressee, verifying its class, and checking the passing of the call-sign toward the addressee, the recorder closes the connection between the caller and the addressee, a rest current is established, which maintains the monitoring relay in closed condition.

The telegraph modulation resulting from the passing of the message, which consists of a sequence of positive or negative periods of relatively short duration, must not allow the de-energizing of the monitoring relay, although this modulation may range from 50 to 200 bauds. On the other hand, it is also required that any negative signal of a certain duration (for instance longer than 600 milliseconds) must produce a de-energizing of the monitoring relay, for such a signal may, for example, correspond to the clearing signal. The de-energizing of the monitoring relay then brings about the release of the circuit of connected units. It is also evident that the monitoring relay series-mounted on the line must entail no appreciable attenuation or distortion of the telegraph signals resulting in loss of information; consequently, its impedance must be very low. In spite of this requirement, the relay must be sensitive and quick-moving but not sensitive to negative pulses ranging from a few milliseconds to several hundreds of milliseconds.

All of the above-mentioned requirements are difficult to achieve with a conventional electromagnetic relay in which magnetic inertia and mechanical inertia are always a large factor as a result of the relatively large dimensions necessary for insuring the motion of the armature and of the contact springs; as a result, the solution afforded by the prior art has not been fully satisfactory in this respect.

It is the general object of the invention to provide a static arrangement in which the above-mentioned drawbacks are avoided. The arrangement according to the invention consists of a detection arrangement comprising a magnetic amplifier combined with a transistor, and an electronic delay arrangement associated with the detection arrangement.

Applicant has already developed a magnetostatic relay resulting from the association of a magnetic amplifier and a transistor.

In the present invention, the magnetostatic relay has been adapted to the particular problem to be solved by modifying or eliminating some components of the circuitry; besides, the use of a transistor electronic assembly, the operation of which is subjected to a time constant makes it possible to obtain a delay control arrangement providing, in particular, but not exclusively, the operating conditions required from a telegraph monitoring relay.

The advantages of the arrangement according to the invention result, on the one hand, from use of an electronic arrangement, having low power consumption, practically no inertia and being capable of quickly following the states of a circuit, and on the other hand, from the characteristic of the arrangement wherein the impedance inserted into the circuit to be monitored does not distort in any way the telegraph signals since it is negligible value.

These and other characteristics of the invention will be apparent from the following description of an example of a possible embodiment of the arrangement according to the invention, taken in connection with the accompanying drawings, wherein.

Figures 1, 2, 3, 4:
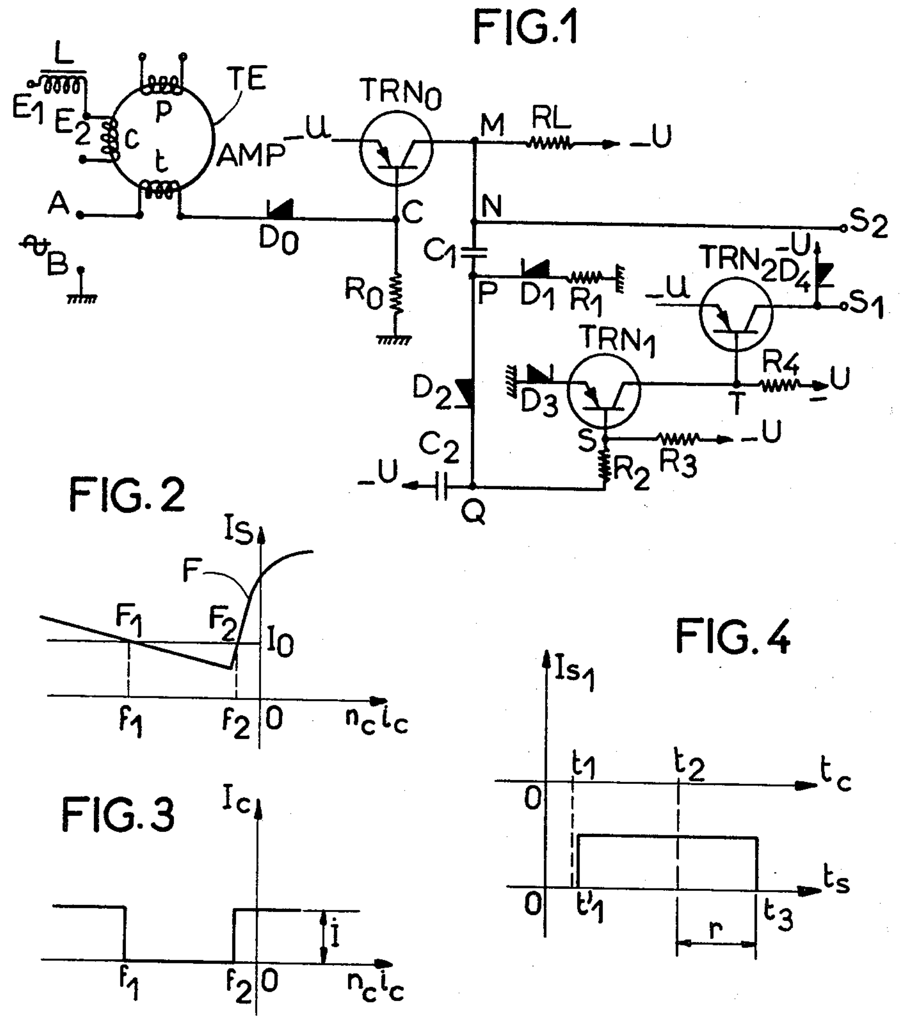
FIGURE 1 is a wiring diagram of the arrangement according to the invention.
FIGURES 2, 3 and 4 are curves relating to the operation of the arrangement shown in FIGURE 1.

The detection unit of the arrangement according to the invention (FIGURE 1) comprises a magnetic amplifier AMP which is made up of a saturable magnetic core TE on which are wound several windings, *t, c, p*. The load winding *t*, series-mounted with a diode DO, is fed from an A.C. supply source AB; the diode DO is mounted in such a way that it only passes the negative half-waves. The control winding *c* is D.C. supplied either from a supply $E_2$ or from a supply $E_1$ through a protection inductance L. The winding *p* is a bias winding D.C. supplied and enabling the setting of the quiescent current of the amplifier AMP. In all cases, the control ampere-turns will be considered as the algebraic sum of the ampere-turns generated by the windings *c* and *p*. The winding *t* is connected through the diode DO to point C at the base of the transistor TRN0, this point being also connected to one end of a resistor $R_0$, the other end of which is connected to ground. The emitter of TRN0 is connected to the negative polarity $-u$ of a D.C. supply and the collector is linked, through a ballast resistor $R_L$, to the negative polarity —U of another D.C. supply. Point M of the collector of TRN0 is connected to point N which is in turn connected to the output terminal $S_2$ on the one hand, and to the plate of a capacitor $C_1$, on the other hand; the branching at the point M of the collector is intended for controlling the release delay unit which will now be described.

The other plate of the capacitor $C_1$ is connected to a point P which is common to two branches: the first of these branches comprises a diode $D_1$ series-connected to a resistor $R_1$, the free end of which is connected to ground, the negative terminal of the diode being connected to point P; the second branch PQ comprises a diode $D_2$, the positive terminal of which is connected to the point P and the negative terminal to point Q. Point Q is connected, on the one hand, to one plate of a capacitor $C_2$, the other plate of which is connected to the voltage —U, and on the other hand to one end of a resistor $R_2$, the other end of which is connected to a common point S. The point S common to the two resistors $R_2$ and $R_3$ is connected to the base of a transistor TRN1 and the other end of the resistor $R_3$ is connected to the voltage —U. The emitter of the transistor TRN1 is connected to ground through the diode $D_3$, the latter being arranged so that its positive terminal is grounded. The collector of transistor TRN1 is connected, on the one hand, to a ballast resistor $R_4$, the other end of which is connected to the negative voltage $-U$ and, on the other hand, to the base of transistor TRN2 (point T). The emitter of transistor TRN1 is connected to the same biasing voltage $-u$ as TRN0, and the collector is connected to the output terminal $S_1$ of the delay arrangement. A diode $D_4$, the positive terminal of which is connected to the voltage $-U$ shunts the collector of transistor TRN2 as a protection against over voltages from $S_1$.

The arrangement described above operates as follows:

The output current $I_S$ of the magnetic amplifier is a function of the algebraic sum of the ampere-turns $N_CI_C$ produced by windings *c* and *p*. Curve F of FIGURE 2 shows $I_S=f(N_CI_C)$. The voltage of point C, at the base of transistor TRN0 is a function of said current $I_S$ and equals $-N_OI_S$, $I_S$ being always negative because of rectifier DO. Now, the transistor TRN0 becomes conducting when the voltage of point C becomes more negative than that ($-u$) of the emitter. There is consequently a particular value of the current $I_S$ which makes point C voltage the same as that of the emitter $-u$. If this current is designated $I_O$, which is the threshold value for control of transistor TRN0, above $I_O$ the transistor will become conducting while below $I_O$ it will be blocked. This value $I_O$ is given by $I_O=u/R_O$.

In FIGURE 2, this value $I_O$ is taken on the ordinate and through this point is drawn a line parallel to $n_ci_c$ which intersects curve F in two points $F_1$ and $F_2$. To these points correspond ampere-turn respective numbers $f_1$ and $f_2$. Hence, if the number of negative ampere-turns has an absolute value larger than $f_1$, the current $I_S$ is larger than $I_O$, and the transistor is conducting; the same applies if the number of ampere-turns is algebraically larger than $f_2$. On the other hand, if the number of control ampere-turns is bracketed between the values $f_1$ and $f_2$, $I_S$ is smaller than $I_O$ and the transistor is blocked.

Thus it appears that it is possible to block or unblock the transistor according to the number of control ampere-turns generated by the winding *c*. A variable current at the frequency of the A.C. supply AB flows from the transistor as long as the latter is conducting, in fact, the unblocked transistor oscillates at the frequency of the A.C. supply AB.

FIGURE 3 shows the curve of the current $I_C$ available at the terminal $S_2$ of the arrangement. It may be seen that this current may have two values according to the control ampere-turns; a current I of constant mean value corresponding to the saturation current of the transistor TRN0 when it is conducting and a zero current when the transistor is blocked.

FIGURE 4 shows the shape of the plot of the current $I_{S1}$ delivered at the output terminal $S_1$, the axis $t_c$ is the axis of the control times of the windings such as *c*, the axis $t_s$ shows or represents the appearance and disappearance times of the output current at terminal $S_1$. It may be seen that the interval between the time $t_1$, when the winding *c* current is turned on, and the time $t'_1$ when the output current I starts flowing at the terminal $S_1$, is very short (less than a millisecond); while, the interval between the time $t_2$ when the circuit is turned off in the control winding and the time $t_3$ when the current stops flowing from the terminal $S_1$ is a relatively long time *r* which results from the time delay arrangement as explained hereafter.

When the transistor TRN0 is blocking, the plate of $C_1$ connected to P is being charged via $R_1$ and $D_1$ and the plate connected to the point M is being charged via $R_L$ from the source voltage $-U$. When TRN0 becomes conducting, the charge on capacitor $C_1$ combined with voltage U is applied to the terminals of capacitor $C_2$. As a result, the right-hand plate of $C_2$ is positive with reference to ground so that the base of transistor TRN1 is positive with respect to its emitter; thus the transistor TRN1 is nonconducting. However, due to the voltage $-U$ applied to point T, the transistor TRN2 is then conducting. This state is maintained by the variable current supplied by the collector of TRN0.

At the time when TRN0 becomes blocked due to the change in the control ampere-turns $N_ci_c$, capacitor $C_2$ discharges into the series-resistors $R_2$ and $R_3$; thus the discharge current of $C_1$ keeps blocking the transistor TRN1 during a rather long time (which depends on $C_2$, $R_2$ and $R_3$) after TRN0 has become non-blocking. After this time lapse, TRN1 becomes conducting and TRN2 non-conducting. A true delay arrangement is thus achieved.

Should a conventional electromagnetic relay be controlled from the terminal $S_1$, such a relay will be energized when TRN0 becomes conducting, and will be maintained in operating condition during the telegraph modulation; however, it will be released some time after the final turn off of TRN0 (when the idle period of TRN0 is longer than the delay *r* given by the delay arrangement).

Figure 5:
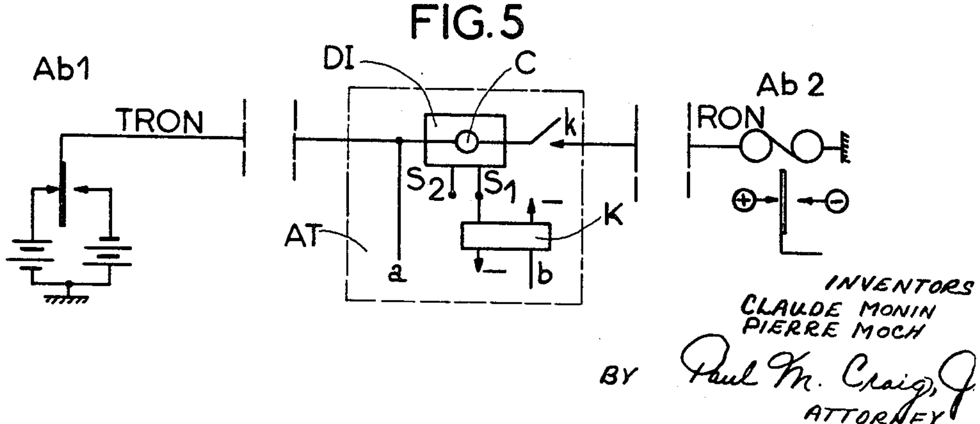
FIGURE 5 shows an embodiment utilizing the telegraph monitoring relay according to the invention.

Let it be assumed, by way of example, that the recorder operating on the wire *b* (FIGURE 5) causes the energizing of the conventional electromagnetic relay K. The contact *k* is made and the subscribers $Ab_1$ and $Ab_2$ are linked for instance in the direction TRON—RON from $Ab_1$ which is passing a message toward $Ab_2$. The control winding *c* pertaining to the arrangement DI of FIGURE 1 according to the invention is assumed to belong to the telegraph automatic selector AT linking the subscribers $Ab_1$ and $Ab_2$. The wire *a* is a control toward the recorder for use before the subscribers are directly connected to each other. As soon as the connection between subscribers is achieved, the positive rest current $Ab_1$ toward $Ab_2$ maintains the operation of the arrangement DI and the relay K may then keep operating without the help of the recorder, which is disconnected from the call. During the modulation consisting of short negative or positive periods, the arrangement DI remains in the operating condition. At the end of the call when a permanent negative current takes place on the line, the arrangement DI is released if the duration of this negative current is longer than the delay *r* provided by the time delay arrangements (see FIGURE 4). As it is released, the arrangement DI causes the denergizing of the relay K which itself frees the circuit being used in the automatic selector. Likewise, if no current flows on the line, the arrangement DI remains idle, the bias winding giving negative ampere-turns which correspond to a current $I_S$ lower than $I_O$ (see FIGURE 2).

A safety device has been provided so as to avoid, during a fortuitous short circuit in the control winding, a spurious energizing of the arrangement because of the resulting current increase. This consists of a series-connecting between the control winding *c* and an inductance L with the purpose of limiting the current in said winding so that the ampere-turns will never be sufficient to cause the energizing of the arrangement under these conditions.

The arrangement according to the invention was described and shown utilizing transistors of the PNP type but it is obvious that NPN type transistors may be used similarly in modifying the polarities of the current supplies and the direction of the diodes and that other modifications and changes may be made to the embodiment of the invention which was given by way of example, without departing from the spirit and scope of the invention.

We claim:

1. A detection and control arrangement, particularly for use as a control for a monitoring relay in telegraph exchanges, capable of controlled delayed operation of said relay comprising:

detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal.

2. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner.

3. A detection and control arrangement, particularly for use a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said magnetic amplifier means including a detection winding connected to said circuit of said telegraph exchange for controlling the output of said magnetic amplifier means in response to control from said circuit.

4. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said magnetic amplifier means including a detection winding connected to said circuit of said telegraph exchange for controlling the output of said magnetic amplifier means in response to control from said circuit, said magnetic amplifier means having means for rendering said transistor switching circuit conductive and non-conductive in response to a closed and open condition, respectively, of said telegraph exchange circuit.

5. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said capacitor means including first and second capacitors connected in series with the output of said transistor switching circuit means including bias means connected to said capacitors for effecting a charging of only said first capacitor when said transistor switching circuit is non-conductive and for effecting discharging of said first capacitor and charging of said second capacitor when said transistor switching circuit is conductive, said release delay means producing an output signal only when said second capacitor is in a predetermined charged condition.

6. A detection and control arrangement, particularly for use as a control for a monitoring relay in telegraph exchanges, capable of controlled delay operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said magnetic amplifier means including a detection winding connected to said circuit of said telegraph exchange for controlling the output of said magnetic amplifier means in response to control from said circuit, said magnetic amplifier means having means for rendering said transistor switching circuit conductive and non-conductive in response to a closed and open condition, respectively, of said telegraph exchange circuit, said transistor switching circuit including a transistor having base, collector and emitter electrodes, the output of said magnetic amplifier means being connected to the base of said transistor, bias means connected to the emitter of said transistor for permitting conduction of said transistor in response to a negative voltage of minimum value, said collector electrode being connected on the one hand to said release delay means and on the other hand to said bias means.

7. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said capacitor means including first and second capacitors and said first and second transistors each having base, emitter and collector electrodes, said first capacitor being connected to the base of said first transistor via a first diode and a first series resistor, negative bias means including a second series resistor connected to the base of said firt transistor, a second diode connecting the point of connection of said first capacitor and said first diode to ground, said second capacitor connecting the point of connection of said first diode and said first series resistor to said negative bias means.

8. A detection and control arrangement, particularly for use as a control for a monitoring relay in telegraph exchanges, capable of controlled delay operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said capacitor means including first and second capacitors and said first and second transistors each having base, emitter and collector electrodes, said first capacitor being connected to the base of said first transistor via a first diode and a first series resistor, negative bias means including a second series resistor connected to the base of said first transistor, a second diode connecting the point of connection of said first capacitor and said first diode to ground, said second capacitor connecting the point of connection of said first diode and said first series resistor to said negative bias means, the collector of said first transistor being connected to the base of said second transistor, said base of said second transistor being connected to said negative bias means, the collector of said second transistor being connected to the output of said release delay means, over-voltage protection means connected to the collector of said second transistor for preventing application of overvoltages from said output to said second transistor.

9. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said capacitor means including first and second capacitors and said first and second transistors each having base, emitter and collector electrodes, said first capacitor being connected to the base of said first transistor via a first diode and a first series resistor, negative bias means including a second series resistor connected to the base of said first transistor, a second diode connecting the point of connection of said first capacitor and said first diode to ground, said second capacitor connecting the point of connection of said first diode and said first series resistor to said negative bias means, the collector of said first transistor being connected to the base of said second transistor, said base of said second transistor being connected to said negative bias means, the collector of said second transistor being connected to the output of said release delay means, over-voltage protection means connected to the collector of said second transistor for preventing application of over-voltages from said output to said second transistor, said over-voltage protection means consisting of a fourth diode having its negative terminal connected to the collector of said second transistor and its positive terminal connected to said negative bias means.

10. A detection and control arrangement, particularly for use as a control for monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said magnetic amplifier means including a detection winding connected to said circuit of said telegraph exchange for controlling the output of said magnetic amplifier means in response to control from said circuit, said transistor switching circuit including a transistor having base, collector and emitter electrodes, the output of said magnetic amplifier means being connected to the base of said transistor, bias means connected to the emitter of said transistor for permitting conduction of said transistor in response to a negative voltage of minimum value, said collector electrode being connected on the one hand to said release delay means and on the other hand to said bias means, said magnetic amplifier means including a bias winding, a load winding and a control winding and inductance means connected to said control winding to prevent accidental operation due to a short circuit in said control winding.

11. A detection and control arrangement, particularly for use as a control for a monitoring relay in telegraph exchanges, capable of controlled delayed operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said magnetic amplifier means including a detection winding connected to said circuit of said telegraph exchange for controlling the output of said magnetic amplifier means in response to control from said circuit, said transistor switching circuit including a transistor having base, collector and emitter electrodes, the output of said magnetic amplifier means being connected to the base of said transistor, bias means connected to the emitter of said transistor for permitting conduction of said transistor in response to a negative voltage of minimum value, said collector electrodes being connected on the one hand to said release delay means and on the other hand to said bias means, said capacitor means including first and second capacitors and said first and second transistors each having base, emitter and collector electrodes, said first capacitor being connected to the base of said first transistor via a first diode and a first series resistor, negative bias means including a second series resistor connected to the base of said first transistor, a second diode connecting the point of connection of said first capacitor and said first diode to ground, said second capacitor connecting the point of connection of said first diode and said first series resistor to said negative bias means, the collector of said first transistor being connected to the base of said second transistor, said base of said second transistor being connected to said negative bias means, the collector of said second transistor being connected to the output of said release delay means, over-voltage protection means connected to the collector of said second transistor for preventing application of over-voltages from said second output to said second transistor.

12. A detection and control arrangement, particularly for use as a control for a monitoring relay in telegraph exchanges, capable of controlled delay operation of said relay comprising detection means including a magnetic amplifier means and a transistor switching circuit connected in series for generating a control signal in response to detection of a predetermined condition of a circuit of said telegraph exchange, release delay means connected to said detection means and including capacitor means and electronic switching means for generating an output signal in response to actuation by said control signal and being capable of maintaining said output signal a predetermined time after extinction of said control signal, said electronic switching means including first and second transistors operating in a mutually exclusionary manner, said magnetic amplifier means including a detection winding connected to said circuit of said telegraph exchange for controlling the output of said magnetic amplifier means in response to control from said circuit, said transistor switching circuit including a transistor having base, collector and emitter electrodes, the output of said magnetic amplifier means being connected to the base of said transistor, bias means connected to the emitter of said transistor for permitting conduction of said transistor in response to a negative voltage of minimum value, said collector electrodes being connected on the one hand to said release delay means and on the other hand to said bias means, said capacitor means including first and second capacitors and said first and second transistors each having base, emitter and collector electrodes, said first capacitor being connected to the base of said first transistor via a first diode and a first series resistor, negative bias means including a second series resistor connected to the base of said first transistor, a second diode connecting the point of connection of said first capacitor and said first diode to ground, said second capacitor connecting the point of connection of said first diode and said first series resistor to said negative bias means, the collector of said first transistor being connected to the base of said second transistor, said base of said second transistor being connected to said negative bias means, the collector of said second transistor being connected to the output of said release delay means, over-voltage protection means connected to the collector of said second transistor for preventing application of over-voltages from said output to said second transistor, said over-voltage protection means consisting of a fourth diode having its negative terminal connected to the collector of said second transistor and its positive terminal connected to said negative bias means, said magnetic amplifier means including a bias winding, a load winding and a control winding and inductance means connected to said control winding to prevent accidental operation due to a short circuit in said control winding.

13. A detection and control arrangement, particularly for use as a control for a monitoring relay in telegraph exchange circuits capable of controlled delayed operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof.

14. A detection and control arrangement, particularly for use as a control for a monitoring relay in telegraph exchange circuits, capable of controlled delayed operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof, said detection means including a magnetic amplifier having a control winding connected to said telegraph exchange circuit and inductance means connected to said control winding to prevent accidental operation of said amplifier, due to short circuits in said control winding.

15. A detection and control arrangement, particularly for use as a control for a monitoring relay in telegraph exchange circuits capable of controlled delayed operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof, said capacitor means including first and second capacitors connected in series with the output of said detection means, bias means connected to said first and second capacitors for effecting charging of said first capacitor and discharging of said second capacitor in absence of said control signal and discharging of said first capacitor and charging of said second capacitor in response to said control signal.

16. A detection and control arrangement, particularly for use as a control for a monitoring relay in telegraph exchange circuits capable of controlled delayed operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof, said capacitor means including first and second capacitors connected in series with the output of said detection means, bias means connected to said first and second capacitors for effecting charging to said first capacitor and discharging of said second capacitor in absense of said control signal and discharging of said first capacitor and charging of said second capacitor in response to said control signal, said release delay means further including transistor control means for generating said output signal in response to a detection of a predetermined charged condition of said second capacitor.

17. A detection and control arrangement, particularly for use as a control for a monitoring relay in telegraph exchange circuits capable of controlled delay operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof, said capacitor means including first and second capacitors connected in series with the output of said detection means, bias means connected to said first and second capacitors for effecting charging to said first capacitor and discharging of said second capacitor in absence of said control signal and discharging of said first capacitor and charging of said second capacitor in response to said control signal, said release delay means further including transistor control means for generating said output signal in response to a detection of a predetermined charged condition of said second capacitor, over-voltage protection means connected to said transistor control means for preventing application of excessive voltage from said relay to said transistor control means.

18. A detection and control arrangement, particularly for use as a control for a monitoring relay in telegraph exchange circuits, capable of controlled delay operation of said relay comprising detection means for generating a control signal in response to detection of a closed circuit condition in a selected telegraph exchange circuit, release delay means connected to said detection means for generating an output signal in response to said control signal including capacitor means for maintaining said output signal a predetermined time after extinction of said control signal, said output signal being applied to said relay to effect operation thereof, said detection means including a magnetic amplifier having a control winding connected to said telegraph exchange circuit and inductance means connected to said control winding to prevent accidental operation of said amplifier due to short circuits in said control winding, said capacitor means including first and second capacitors connected in series with the output of said detection means, bias means connected to said first and second capacitors for effecting charging of said first capacitor and discharging of said second capacitor in absence of said control signal and discharging of said first capacitor and charging of said second capacitor in response to said control signal, said release delay means further including transistor control means for generating said output signal in response to a detection of a predetermined charged condition of said second capacitor.

No references cited.

THOMAS B. HABECKER, *Primary Examiner.*